US012211444B2

(12) United States Patent
Cao et al.

(10) Patent No.: US 12,211,444 B2
(45) Date of Patent: Jan. 28, 2025

(54) PIXEL DRIVE CIRCUIT, PIXEL DRIVE METHOD, AND DISPLAY PANEL

(71) Applicant: HKC CORPORATION LIMITED, Shenzhen (CN)

(72) Inventors: Shangcao Cao, Shenzhen (CN); Baohong Kang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/337,621

(22) Filed: Jun. 20, 2023

(65) Prior Publication Data

US 2024/0296796 A1 Sep. 5, 2024

(30) Foreign Application Priority Data

Mar. 2, 2023 (CN) ......................... 202310191098.2

(51) Int. Cl.
*G09G 3/325* (2016.01)
*G09G 3/3258* (2016.01)

(52) U.S. Cl.
CPC ........... *G09G 3/325* (2013.01); *G09G 3/3258* (2013.01); *G09G 2320/0233* (2013.01)

(58) Field of Classification Search
CPC ............. H10K 59/00–95; G09G 3/342; G09G 2320/0626; G09G 2310/08; G09G 3/3406; G09G 2330/04; G09G 3/3233; G09G 2320/0233; G09G 3/3208; G09G 2300/0443; G09G 2300/0413; G09G 2300/0809; G09G 3/30
See application file for complete search history.

(56) References Cited

U.S. PATENT DOCUMENTS

2017/0046006 A1* 2/2017 Kim ...................... G06F 3/0443
2022/0139319 A1* 5/2022 Oh ...................... H01L 25/0753
345/204

FOREIGN PATENT DOCUMENTS

CN 104134426 A 11/2014
CN 107507573 A 12/2017
CN 108877670 A 11/2018
CN 110060631 A 7/2019
(Continued)

OTHER PUBLICATIONS

CN-114267297-A (Year: 2023).*

*Primary Examiner* — Sanjiv D. Patel
(74) *Attorney, Agent, or Firm* — Maier & Maier, PLLC

(57) ABSTRACT

A pixel drive circuit which includes a first data input circuit, a second data input circuit, a current regulation circuit, a first energy storage circuit, a second energy storage circuit, a first light-emitting control circuit and a second light-emitting control circuit. The first and second data input circuits are in electrical connection with control ends of the first and second light-emitting control circuits, respectively. Inputs of the first and second light-emitting control circuits are both in electrical connection with a first power supply. Outputs of the first and second light-emitting control circuit are in electrical connection with anodes of a first light-emitting device and a second light-emitting device, respectively. The first light-emitting device and the second light-emitting device emit light simultaneously. The current regulation circuit is in electrical connection with an output of the second data input circuit.

16 Claims, 6 Drawing Sheets

(56) References Cited

FOREIGN PATENT DOCUMENTS

| | | | | | |
|---|---|---|---|---|---|
| CN | 110992890 | A | | 4/2020 | |
| CN | 111477166 | A | | 7/2020 | |
| CN | 113270071 | A | | 8/2021 | |
| CN | 114038425 | A | | 2/2022 | |
| CN | 114267297 | A | * | 4/2022 | ........... G09G 3/3233 |
| CN | 115050307 | A | | 9/2022 | |
| CN | 115862540 | A | | 3/2023 | |
| KR | 1020060032826 | A | | 4/2006 | |
| KR | 1020150059919 | A | | 6/2015 | |

* cited by examiner

PIXEL DRIVE CIRCUIT, PIXEL DRIVE METHOD, AND DISPLAY PANEL

CROSS-REFERENCE TO RELATED APPLICATION

Pursuant to 35 U.S.C. § 119 and the Paris Convention, this application claims the benefit of Chinese Patent Application No. 202310191098.2 filed on Mar. 2, 2023, the content of which is incorporated herein by reference.

TECHNICAL FIELD

The present application relates to the field of display technology, and in particular, to a pixel drive circuit, a pixel drive method and a display panel.

BACKGROUND

The statements provided herein are merely background information related to the present application, and do not necessarily constitute any prior arts. Light-emitting devices, such as an organic light-emitting diode (OLED), due to their characteristics such as, thin and lightness, energy efficient, wide viewing angle, wide color gamut and high contrast, have gradually been widely used in televisions, mobile phones, notebooks and other products.

The materials of light-emitting devices such as OLEDs will gradually age during usage, which will affect the image quality of the display panel. At present, in order to solve the aging problem of light-emitting devices such as OLEDs, a method of connecting two OLEDs in parallel are usually used. By reducing the driving current of OLEDs, the aging of OLEDs is delayed without affecting the luminance of OLEDs.

However, in the above solution, the insulation property of two OLED packages will be different, and the impedance of the anode and cathode corresponding to the two OLEDs will also be different. As a result, the characteristics of the two OLEDs will be different, which results in differences in the brightness of the two OLEDs, and thereby affects the uniformity of the display screen.

SUMMARY

In view of this, the present application provides a pixel drive circuit, a pixel drive method and a display panel, to reduce the brightness difference between two parallel-connected OLEDs and improve the uniformity of the display screen.

In order to achieve the above objective, in accordance with a first aspect, an embodiment of the present application provides a pixel drive circuit, including: a first data input circuit, a second data input circuit, a current regulation circuit, a first energy storage circuit, a second energy storage circuit, a first light-emitting control circuit and a second light-emitting control circuit.

The first data input circuit is in electrical connection with a control end of the first light-emitting control circuit, and is configured to output a data voltage to the control end of the first light-emitting control circuit in a reset phase and a compensation phase. The second data input circuit is in electrical connection with a control end of the second light-emitting control circuit, and is configured to output the data voltage to the control end of the second light-emitting control circuit in the reset phase and the compensation phase.

The first energy storage circuit is connected between the control end and an output of the first light-emitting control circuit. The second energy storage circuit is connected between the control end and an output of the second light-emitting control circuit. Both the first energy storage circuit and the second energy storage circuit are configured to store electrical energy.

Inputs of the first light-emitting control circuit and the second light-emitting control circuit are both in electrical connection with a first power supply, the output of the first light-emitting control circuit is in electrical connection with an anode of a first light-emitting device, and the light-emitting control circuit is configured to output a first driving current to the first light-emitting device in a light-emitting phase. The output of the second light-emitting control circuit is in electrical connection with an anode of a second light-emitting device, and the second light-emitting control circuit is configured to output a second driving current to the second light-emitting device in the light-emitting phase. A cathode of the first light-emitting device and a cathode of the second light-emitting device are both in electrical connection with a second power supply; the first light-emitting device and the second light-emitting device are configured to emit light simultaneously.

The current regulation circuit is in electrical connection with an output of the second data input circuit, and the current regulation circuit is configured to regulate a voltage at the control end of the second light-emitting control circuit in the reset phase and the compensation phase, so as to regulate the second driving current in the light-emitting phase.

As an optional implementation of the embodiment of the present application, the current regulation circuit includes a first switch, a voltage signal line, and a first scan line.

A control electrode of the first switch is in electrical connection with an output of the first scan line, a first electrode of the first switch is in electrical connection with an output of the voltage signal line, and a second electrode of the first switch is in electrical connection with the output of the second data input circuit.

As an optional implementation of the embodiment of the present application, the voltage signal line is configured to output a constant voltage.

As an optional implementation of the embodiment of the present application, the first data input circuit includes a second switch, a data line and a first scan line; and the second data input circuit includes a third switch, the data line and the first scan line.

Control electrodes of the second switch and the third switch are both in electrical connection with an output of the first scan line, and first electrodes of the second switch and the third switch are both in electrical connection with an output of the data line, a second electrode of the second switch is in electrical connection with the control end of the first light-emitting control circuit, and a second electrode of the third switch is in electrical connection with the control end of the second light-emitting control circuit.

As an optional implementation of the embodiment of the present application, the pixel drive circuit further includes: a detection circuit and a compensation circuit.

An input of the detection circuit is in electrical connection with the output of the first light-emitting control circuit, an output of the detection circuit is in electrical connection with an input of the compensation circuit, and the detection circuit is configured to detect the first driving current output from the first light-emitting control circuit.

An output of the compensation circuit is in electrical connection with the first data input circuit, and the compensation circuit is configured to regulate the data voltage output from the first data input circuit according to the first driving current in the reset phase and the compensation phase.

As an optional implementation of the embodiment of the present application, the detection circuit includes: a fourth switch and a current sensor.

A control electrode of the fourth switch is in electrical connection with the second scan line, a first electrode of the fourth switch is in electrical connection with the output of the second light-emitting control circuit, a second electrode of the fourth switch is in electrical connection with an input of the current sensor, and an output of the current sensor is in electrical connection with the input of the compensation circuit.

As an optional implementation of the embodiment of the present application, the first light-emitting control circuit includes a fifth switch, and the second light-emitting control circuit includes a sixth switch;

First electrodes of the fifth switch and the sixth switch are both in electrical connection with the first power supply, a second electrode of the fifth switch is in electrical connection with the anode of the first light-emitting device, a control electrode of the fifth switch is in electrical connection with the first data input circuit, a second electrode of the sixth switch is in electrical connection with the anode of the second light-emitting device, and a control electrode of the sixth switch It is electrically connected with the second data input circuit.

In accordance with a second aspect, an embodiment of the present application provides a pixel drive method, which is applied to the pixel drive circuit described in the first aspect or any one of the first aspect, and the method includes that:

In the reset phase and the compensation phase, a first potential signal is input to the first data input circuit, the second data input circuit and the current regulation circuit to control the first data input circuit, the second data input circuit and the current regulation circuit to be switched on.

In the light-emitting phase, a second potential signal is input to the first data input circuit, the second data input circuit and the current regulation circuit, to control the first data input circuit, the second data input circuit and the current regulation circuit to be switched off.

As an optional implementation of the embodiment of this application, the method also includes that:

In the reset phase and the compensation phase, the second potential signal is input to the detection circuit, to control the detection circuit to be switched off.

In the light-emitting phase, the first potential signal is input to the detection circuit to control the detection circuit to be switched on.

In accordance with a third aspect, an embodiment of the present application provides a display panel, including a plurality of pixel units, where each pixel unit includes a plurality of sub-pixel units, each sub-pixel unit includes two light-emitting devices and the pixel drive circuit described in the first aspect or any one of the first aspect.

The technical solution provided by the embodiment of the present application includes a first data input circuit, a second data input circuit, a current regulation circuit, a first energy storage circuit, a second energy storage circuit, a first light-emitting control circuit and a second light-emitting control circuit. The first data input circuit is in electrical connection with a control end of the first light-emitting control circuit, and is configured to output a data voltage to the control end of the first light-emitting control circuit in a reset phase and a compensation phase. The second data input circuit is in electrical connection with a control end of the second light-emitting control circuit, and is configured to output the data voltage to the control end of the second light-emitting control circuit in the reset phase and the compensation phase. The first energy storage circuit is connected between the control end and an output of the first light-emitting control circuit, and the second energy storage circuit is connected between the control end and an output of the second light-emitting control circuit. Both the first energy storage circuit and the second light-emitting control circuit are configured to store electric energy. Both an input of the first light-emitting control circuit and an input of the second light-emitting control circuit are in electrical connection with a first power supply. The output of the first light-emitting control circuit is in electrical connection with an anode of a first light-emitting device, and the first light-emitting control circuit is configured to output a first driving current to the first light-emitting device. The output of the second light-emitting control circuit is in electrical connection with an anode of a second light-emitting device, and the second light-emitting control circuit is configured to output a second driving current to the second light-emitting device in the light emitting phase. Both a cathode of the first light-emitting device and a cathode of the second light-emitting device are in electrical connection with a second power supply. The first light-emitting device and the second light-emitting device emit light simultaneously. The current regulation circuit is in electrical connection with an output of the second data input circuit, and the current regulation circuit is configured to regulate a voltage at the control end of the second light-emitting control circuit in the reset phase and the compensation phase, so as to regulate the second driving current in the light-emitting phase. In the above technical solution, the first light-emitting device and the second light-emitting device are configured to emit light simultaneously, the first light-emitting device and the second light-emitting device are respectively driven by different light-emitting control circuits. The current regulation circuit is enabled to adjust the brightness of the second light-emitting device by regulating the driving current of the second light-emitting device (i.e., the second driving current), thereby enabling the brightness of the second light-emitting device to approach that of the first light-emitting device, so that this solution can reduce the difference in brightness of the first light-emitting device and the second light-emitting device caused by the difference in characteristics of the first light-emitting device and the second light-emitting device, thereby enabling the brightness of different sub-pixels tend to be consistent, which improves the uniformity of the display screen.

DETAILED DESCRIPTION OF EMBODIMENTS

Embodiments of the present application are described below with reference to the drawings in the embodiments of the present application. The terms used in implementations of the embodiments of the present application are only used to explain the specific embodiments of the present application, and are not intended to limit the present application. The following specific embodiments may be combined with each other, and the same or similar concepts or processes may not be repeated in some embodiments.

The light-emitting device in the embodiments of the present application may be any one of an OLED, a quantum dot light-emitting diode (QLED) and a sub-millimeter light-emitting diode (Mini Light Emitting Diodes, Mini LED). In the following, the embodiment will take the OLED as an example for exemplary description.

Figure 1:
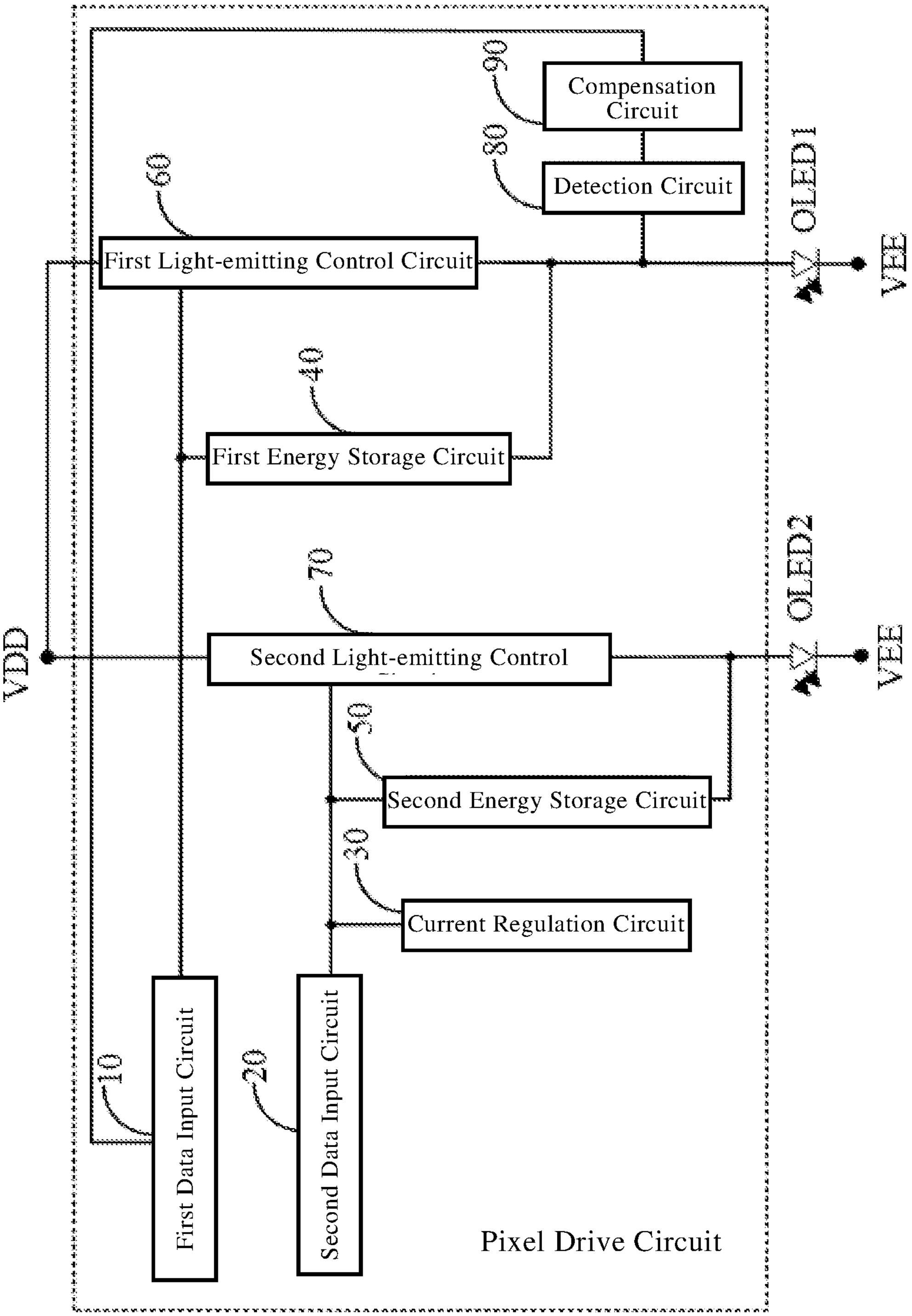
FIG. 1 is a schematic structural diagram of a sub-pixel of any pixel unit in a display panel according to an embodiment of the present application.

The display panel provided by an embodiment of the present application may include multiple pixel units, and each pixel unit may include multiple sub-pixel units. FIG. 1 is a schematic structural diagram of a sub-pixel unit of any pixel unit in a display panel provided by an embodiment of the present application. As shown in FIG. 1, the sub-pixel unit may include a first power supply VDD, a second power supply VEE, a first light-emitting device OLED1, a second light-emitting device OLED2 and a pixel drive circuit.

The first power supply VDD may output a high-potential voltage, and the second power supply VEE can output a low-potential voltage.

The pixel drive circuit may include: a first data input circuit 10, a second data input circuit 20, a current regulation circuit 30, a first energy storage circuit 40, a second energy storage circuit 50, a first light-emitting control circuit 60 and a second light-emitting control circuit 70.

The first data input circuit 10 is in electrical connection with a control end of the first light-emitting control circuit 60, and is configured to output a data voltage to the control end of the first light-emitting control circuit 60 in a reset phase and a compensation phase. The second data input circuit 20 is in electrical connection with a control end of the second light-emitting control circuit 70, and is configured to output a data voltage to the control end of the second light-emitting control circuit 70 in the reset phase and the compensation phase.

The first energy storage circuit 40 is connected between the control end and an output of the first light-emitting control circuit 60. The second energy storage circuit 50 is connected between the control end and an output of the second light-emitting control circuit 70. Both the first energy storage circuit 40 and the second energy storage circuit 50 are configured to store electric energy.

An input of the first light-emitting control circuit 60 and an input of the second light-emitting control circuit 70 are in electrical connection with the first power supply VDD. The output of the first light-emitting control circuit 60 is in electrical connection with an anode of the first light-emitting device OLED1, and the first light-emitting control circuit 60 is configured to output a first driving current to the first light-emitting device OLED1 in a light-emitting phase. The output of the second light-emitting control circuit 70 is in electrical connection with an anode of the second light-emitting device OLED2, and the second light-emitting control circuit 70 is configured to output a second driving current to the second light-emitting device OLED2 in the light-emitting phase. Both a cathode of the first light-emitting device OLED1 and a cathode of the second light-emitting device OLED2 are in electrical connection with the second power supply VEE, and the first light-emitting device OLED1 and the second light-emitting device OLED2 emit light simultaneously.

The current regulation circuit 30 is in electrical connection with an output of the second data input circuit 20, and the current regulation circuit 30 is configured to regulate a voltage at the control end of the second light-emitting control circuit in the reset phase and the compensation phase, so as to regulate the second driving current in the light-emitting phase.

Since the first light-emitting device OLED1 and the second light-emitting device OLED2 are respectively driven by different light-emitting control circuits, the current regulation circuit 30 can adjust a brightness of the second light-emitting device OLED2 by regulating a driving current (i.e., the second driving current) of the second light-emitting device OLED2, to bring the brightness of the second light-emitting device OLED2 to be more closer to that of the first light-emitting device OLED1, thereby the difference in brightness of the first light-emitting device OLED1 and the second light-emitting device due to the difference in characteristics of the first light-emitting device OLED1 and the second light-emitting device can be reduced, and the uniformity of the display screen can be improved. Meanwhile, due to a decrease of the brightness difference between the first light-emitting device OLED1 and the second light emitter, the aging degree of the first light-emitting device OLED1 and the second light emitter will be closer, so that the probability that one OLED can still be used normally while the other OLED has aged and cannot be used normally is reduced, and thus the service life of the OLED can be prolonged.

The pixel drive circuit may further include a detection circuit 80 and a compensation circuit 90.

An input of the detection circuit 80 is in electrical connection with the output of the first light-emitting control circuit 60, an output of the detection circuit 80 is in electrical connection with an input of the compensation circuit 90, and the detection circuit 80 is configured to detect the first driving current output from the first light-emitting control circuit 60 in the light emitting phase.

An output of the compensation circuit 90 is in electrical connection with the first data input circuit 10, and the compensation circuit 90 is configured to regulate the data voltage output from the first data input circuit 10 according to the first driving current in the reset phase and the compensation phase. The driving current of the first light-emitting device OLED1 of each sub-pixel may be regulated through the detection circuit 80 and the compensation circuit 90, to enable the driving current of the first light-emitting device OLED1 of each sub-pixel to be closer to each other under the same gray scale, so as to improve the uniformity of the display screen.

Figure 2:
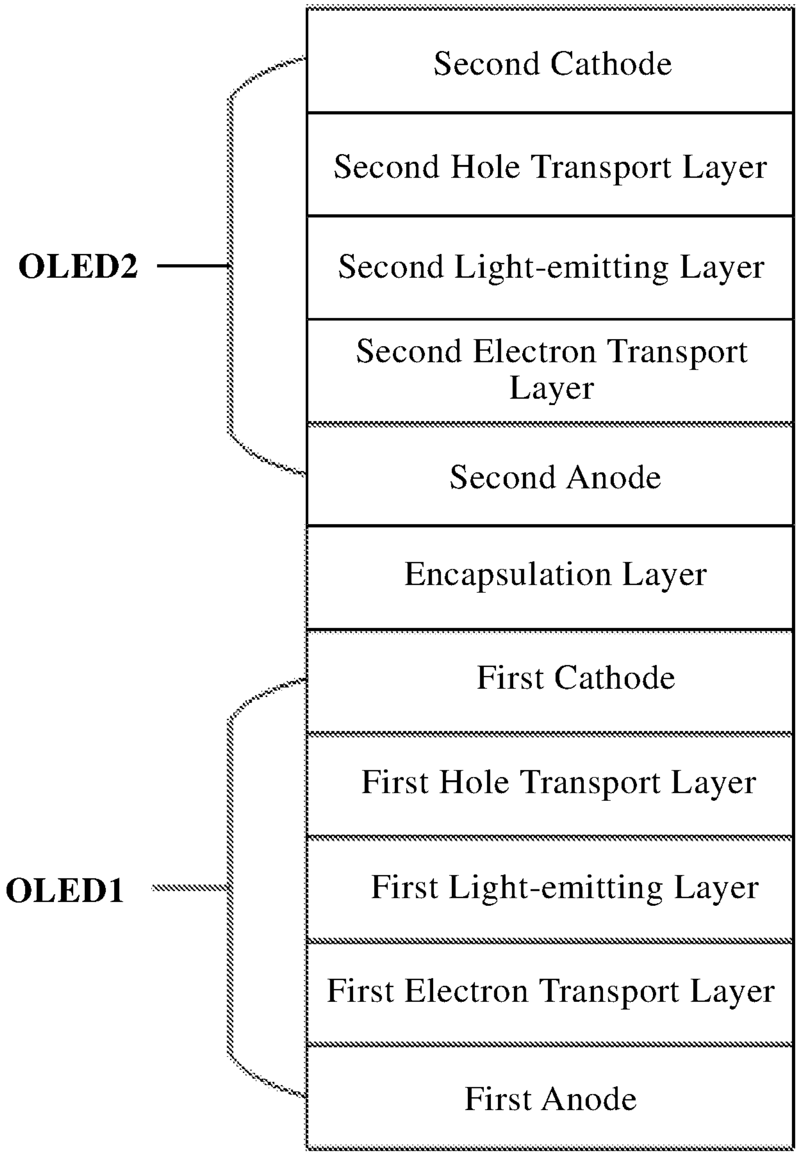
FIG. 2 is a schematic structural diagram of OLED1 and OLED2 in a vertical direction in FIG. 1.

FIG. 2 is a schematic structural diagram of OLED1 and OLED2 in the vertical direction in FIG. 1. As shown in FIG. 2, OLED1 may be located below OLED2.

OLED1 may include a first anode, a first electron transport layer, a first light-emitting layer, a first hole transport layer and a first cathode, arranged in sequence from bottom to top.

OLED2 may include a second anode, a second electron transport layer, a second light-emitting layer, a second hole transport layer and a second cathode, arranged in sequence from bottom to top.

An encapsulation layer may also be arranged between OLED1 and OLED2.

Materials of the first cathode, the encapsulation layer, the second anode and the second cathode may be transparent conductive materials, so that light emitted from the first light-emitting layer of the OLED1 can pass through.

Figure 3:
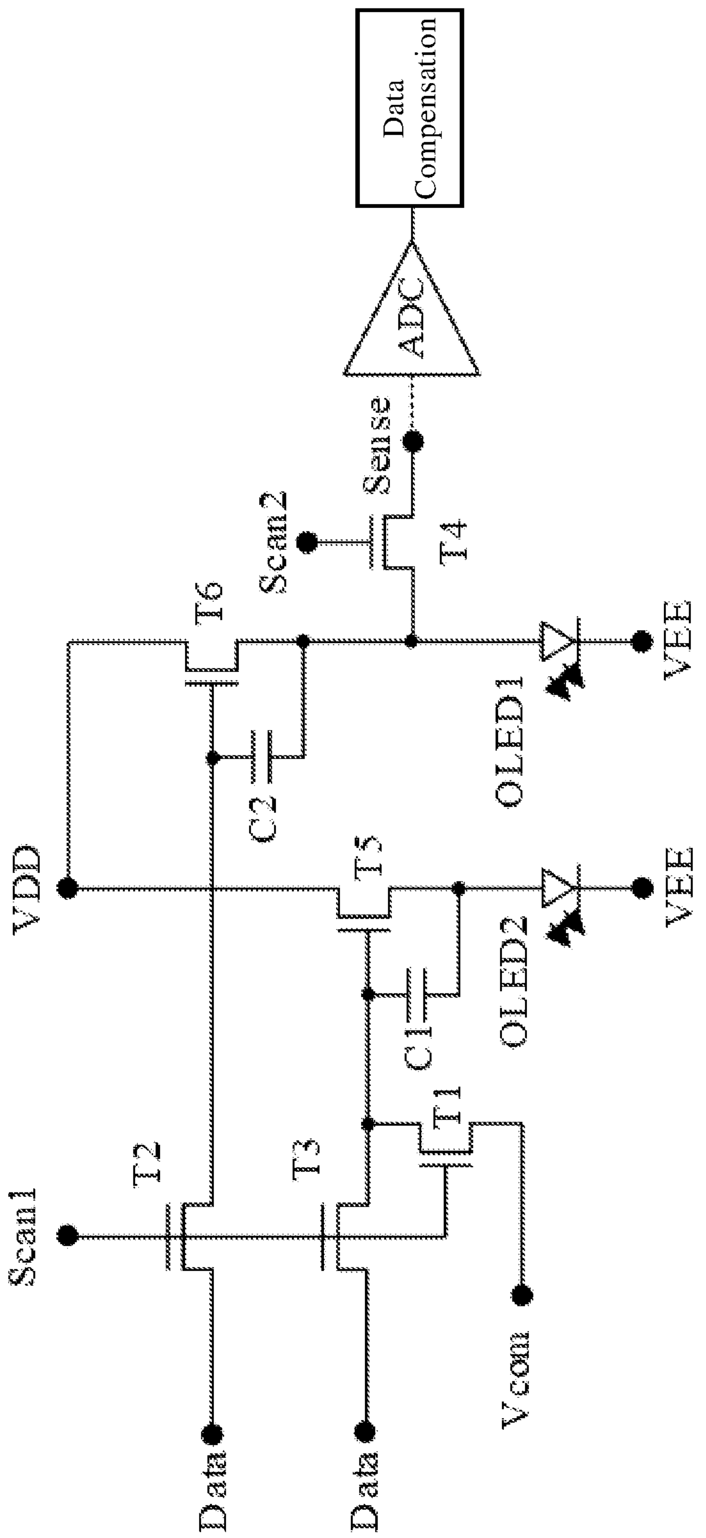
FIG. 3 is a schematic diagram of a circuit structure of the pixel drive circuit in FIG. 1.

FIG. 3 is a schematic diagram of a circuit structure of the pixel drive circuit in FIG. 1. As shown in FIG. 3, the current regulation circuit 30 may include a first switch T1, a voltage signal line Vcom and a first scan line Scan1.

A control electrode of the first switch T1 is in electrical connection with an output of the first scan line Scan1, a first electrode of the first switch T1 is in electrical connection with an output of the voltage signal line Vcom, and a second electrode of the first switch T1 is in electrical connection with the output of the second data input circuit 20.

A voltage output from the voltage signal line Vcom may be preset. For example, before the display panel leaves a factory, the output voltage of the voltage signal line Vcom may be determined by detecting the brightness of the first light-emitting device OLED1 and the second light-emitting device OLED2. The voltage may enable the difference between the brightness of the second light-emitting device OLED2 and the brightness of the first light-emitting device OLED1 to be smaller than a target threshold. In this way, a regulation to the voltage output from the voltage signal line Vcom will not be needed after the device leaves the factory, which can reduce power consumption. Since the brightness difference between the first light-emitting device OLED1 and the second light-emitting device OLED2 may be increased again after the first light-emitting device OLED1 and the second light-emitting device OLED2 have been operated for a period of time, a detection on the brightness difference between the device OLED1 and the second light-emitting device OLED2 may also be performed at each startup, and then the voltage output from the voltage signal line Vcom is regulated according to the brightness of the first and second light-emitting devices OLED1, OLED2, to reduce the difference in brightness of the first light-emitting device OLED1 and the second light-emitting device OLED2 that is increased again after being operated for a period of time, and to improve the uniformity of the display screen.

The first data input circuit 10 may include a second switch T2, a data line Data, and a first scan line Scan1. The second data input circuit 20 may include a third switch T3, the data line Data, and the first scan line Scan1.

A control electrode of the second switch T2 and a control electrode of the third switch T3 are in electrical connection with an output of the first scan line Scan1, a first electrode of the second switch T2 and a first electrode of the third switch T3 are in electrical connection with an output of the data line Data, a second electrode of the second switch T2 is in electrical connection with the control end of the first light-emitting control circuit 60, and a second electrode of the third switch T3 is in electrical connection with the control end of the second light-emitting control circuit 70.

The control electrodes of the first switch T1, the second switch T2 and the third switch T3 may be connected to a same scan line (i.e., the first scan line Scan1), which can reduce the number of scan lines in the pixel drive circuit and reduce the complexity of the pixel drive circuit. In case that the control electrodes of the first switch T1, the second switch T2 and the third switch T3 are connected to the same scan line, the first switch T1, the second switch T2 and the third switch T3 are field effect thin film transistors of a same type, for example, all of the first switch T1, the second switch T2 and the third switch T3 are P-type field effect thin film transistors, or all of the first switch T1, the second switch T2 and the third switch T3 are N-type field effect thin film transistors.

The control electrodes of the first switch T1, the second switch T2 and the third switch T3 may also be connected to different scan lines, so that the types of the first switch T1, the second switch T2 and the third switch T3 may not necessarily be field effect thin film transistors of the same type, and P type field effect thin film crystals or N type field effect thin film transistors can be flexibly selected.

In this embodiment, that the control electrodes of the first switch T1, the second switch T2 and the third switch T3 are all connected to the same scan line, is taken as an example for exemplary description.

The detection circuit 80 may include a fourth switch T4 and a current sensor Sense.

A control electrode of the fourth switch T4 is in electrical connection with a second scan line Scan2, a first electrode of the fourth switch T4 is in electrical connection with the output of the second light-emitting control circuit 70, and a second electrode of the fourth switch T4 is connected to an input of the current sensor Sense. An output of the current sensor Sense is in electrical connection with the input of the compensation circuit 90.

The compensation circuit 90 may be integrated on a main control chip, or may be a section of circuit outside the main control chip. The compensation circuit 90 may include an analog-to-digital converter (ADC) and a data compensation unit.

The second scan line Scan2 may output a high level in the light-emitting phase, to enable the fourth switch T4 to be switched on, and the current sensor Sense detects the first driving current output from the first light-emitting control circuit 60, and transmits the current to the compensation circuit 90. The compensation circuit 90, upon receiving the current transmitted by the current sensor Sense, may convert the current through an ADC to obtain a current variation value, and then perform, according to the current variation value, an adjustment on the data voltage output from the data line Data through the data compensation unit in the next reset phase and compensation phase.

It can be understood that the second scan line Scan2 may also output a high level at each startup, to enable the fourth switch T4 to be switched on, so as to detect the first driving current.

The first light-emitting control circuit 60 may include a fifth switch T5, and the second light-emitting control circuit 70 may include a sixth switch T6.

Both a first electrode of the fifth switch T5 and a first electrode of the sixth switch T6 are in electrical connection with the first power supply VDD. A second electrode of the fifth switch T5 is in electrical connection with the anode of the first light-emitting device OLED1, and a control electrode of the fifth switch T5 is in electrical connection with the second electrode of the third switch T3. A second electrode of the sixth switch T6 is in electrical connection with the anode of the second light-emitting device OLED2, and a control electrode of the sixth switch T6 is in electrical connection with the second electrode of the second switch T2.

The first switch T1, the second switch T2, the third switch T3, the fourth switch T4, the fifth switch T5 and the sixth switch T6 may be PMOS transistors or NMOS transistors. In case that the switch is a PMOS transistor, the first electrode of the switch is the source, the second electrode of the switch is the drain, and the control electrode of the switch is the gate. In case that the switch is an NMOS transistor, the first electrode of the switch is the drain, and the second electrode of the switch is the source and the control electrode of the switch is the gate. In this embodiment, that the foregoing switches are all NMOS transistors, is taken as an example for exemplary description.

The first energy storage circuit 40 may include a first capacitor C1, one end of the first capacitor C1 is in electrical connection with the control electrode of the fifth switch T5, and the other end of the first capacitor C1 is in electrical connection with the second electrode of the fifth switch T5.

The second energy storage circuit 50 may include a second capacitor C2, one end of the second capacitor C2 is in electrical connection with the control electrode of the sixth switch T6, and the other end of the second capacitor C2 is in electrical connection with the second electrode of the sixth switch T6.

Figure 4:
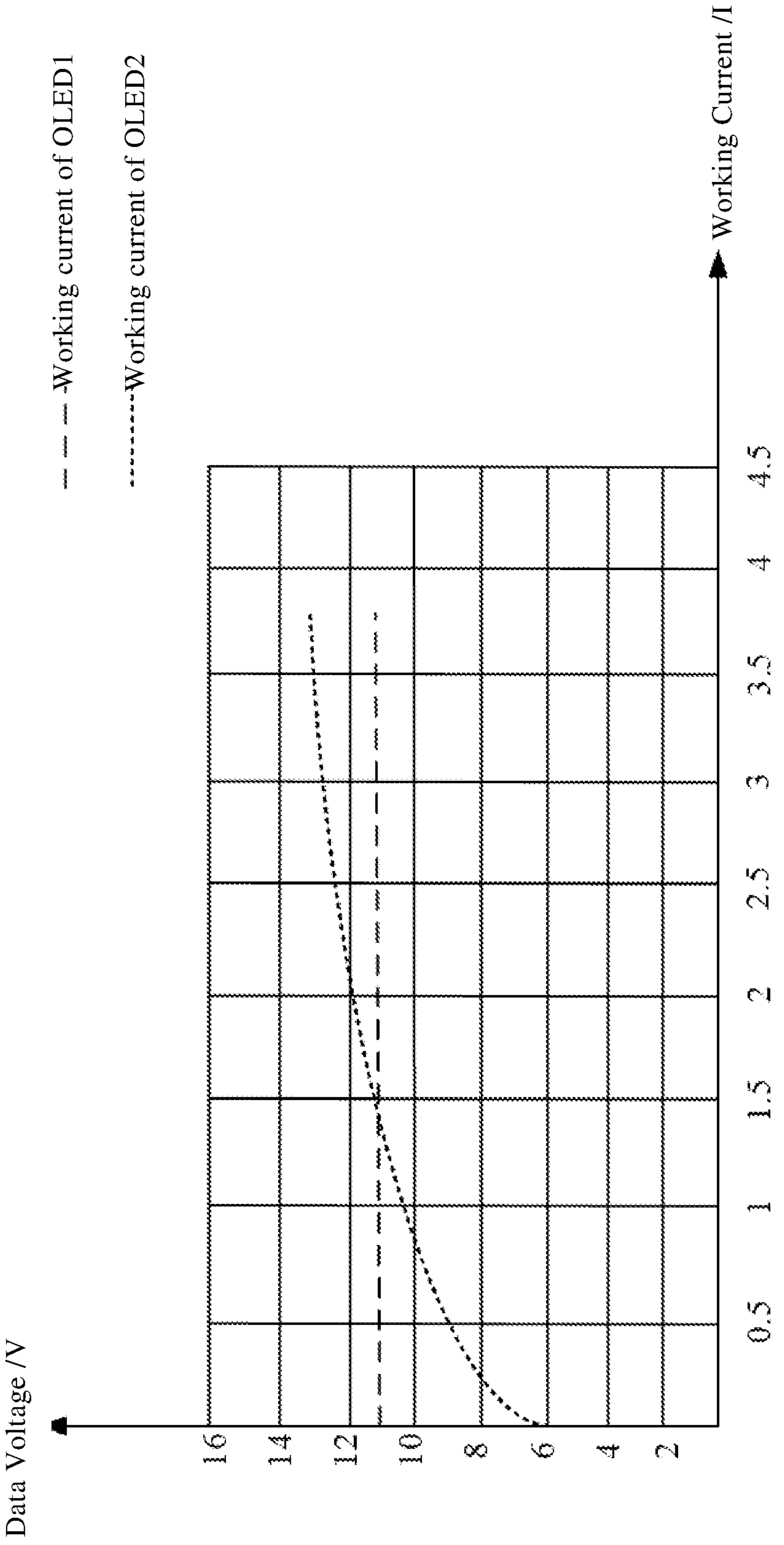
FIG. 4 is a schematic diagram of working currents of OLED1 and OLED2 in FIG. 3.

FIG. 4 is a schematic diagram of working currents of OLED1 and OLED2 in FIG. 3. As shown in FIG. 4, the driving current of OLED2 is regulated by regulating the voltage output from the voltage signal line Vcom, thereby achieving the goal of regulating the working current of OLED2, so that the working current of OLED2 can be regulated to approach the working current of OLED1, so as to reduce the brightness difference between OLED2 and OLED1.

An embodiment of the present application also provides a pixel drive method, which is applied to the above-mentioned pixel drive circuit. In the reset phase and the compensation phase, a first potential signal is input to the first data input circuit, the second data input circuit and the current regulation circuit, to control the first data input circuit, the second data input circuit and the current regulation circuit to be switched on; and a second potential signal is input to the detection circuit input, to control the detection circuit to be switched off.

In the light-emitting phase, the second potential signal is input to the first data input circuit, the second data input circuit and the current regulation circuit, to control the first data input circuit, the second data input circuit and the current regulation circuit to be switched off; and the first potential signal is input to the detection circuit, to control the detection circuit to be switched on.

The first potential signal may be a high-potential signal or a low-potential signal. In case that the first switch T1, the second switch T2, the third switch T3 and the fourth switch T4 are NMOS transistors, the first potential signal is a high-potential signal. In case that the first switch T1, the second switch T2, the third switch T3 and the fourth switch T4 are PMOS transistors, the first potential signal is a low-potential signal. In case that the first potential signal is a high-potential signal, then the second potential signal is a low-potential signal; and in case that the first potential signal is a low-potential signal, then the second potential signal is a high-potential signal. In this embodiment, that the first potential signal is a high-potential signal and the second potential signal is a low-potential signal, is taken as an example for exemplary description.

Figure 5:
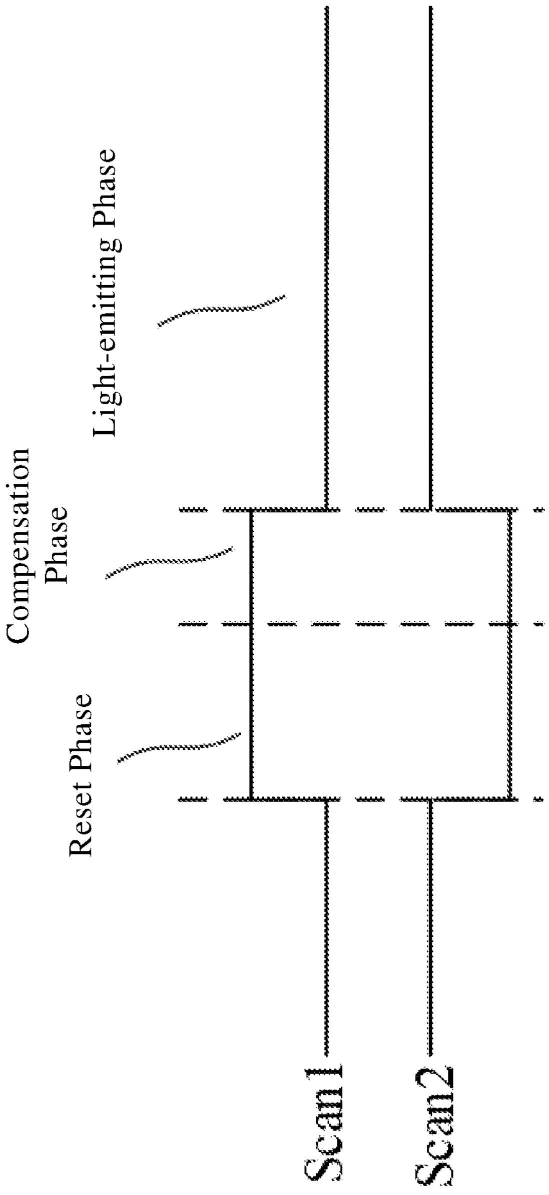
FIG. 5 is an operation timing diagram of a pixel drive circuit controlled by a pixel drive method according to an embodiment of the present application.

FIG. 5 is an operation timing diagram of the pixel drive circuit controlled by the pixel drive method provided in an embodiment of the present application. As shown in FIG. 5, in the reset phase and the compensation phase, the first scan line Scan1 outputs a high-potential signal, first switch T1, the second switch T2 and the third switch T3 are switched on, the gate voltage of the sixth switch T6 is the data voltage, and the gate voltage of the fifth switch T5 is jointly determined by the voltage output from the data line and the voltage output from the voltage signal line Vcom. The brightness of OLED2 is adjusted through Vcom, to enable the brightness of OLED2 and OLED1 to approach the same; the second scan line Scan2 outputs a low-potential signal, and the fourth switch T4 is switched off.

In the light-emitting phase, the first scan line Scan1 outputs a low-potential signal, the first switch T1, the second switch T2 and the third switch T3 are switched off, the fifth switch T5 and the sixth switch T6 are switched on, OLED1 and OLED2 emit light. The second scan line Scan2 outputs a high-potential signal, the fourth switch T4 is switched on, the current sensor Sense is configured to detect the first driving current output from the source of the sixth switch T6, and transmit the current to the compensation circuit 90. The compensation circuit 90, upon receiving the current transmitted by the current sensor Sense, may convert the current through an ADC to obtain a current variation value, and then perform, according to the current variation value, an adjustment on the data voltage output from the data line Data by the data compensation unit in the next reset phase and compensation phase, so that the driving current of OLED1 in each sub-pixel unit tends to be consistent under the same gray scale.

Figure 6:
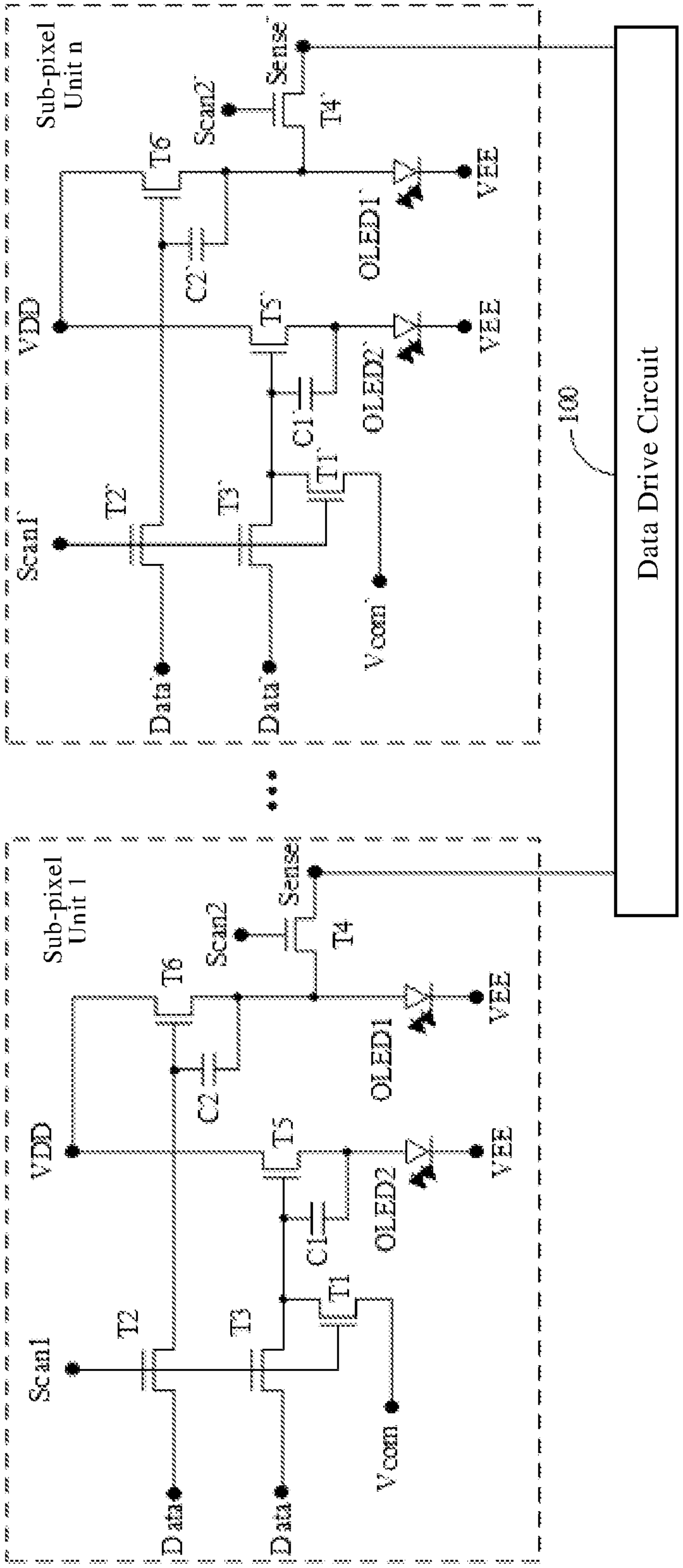
FIG. 6 is a schematic structural diagram of a display panel according to an embodiment of the present application.

FIG. 6 is a schematic structural diagram of a display panel provided by an embodiment of the present application. As shown in FIG. 6, the display panel provided by the embodiment of the present application may also include a data drive circuit 100, and the data drive circuit 100 may be integrated on the main control chip. An input of the circuit 100 may be in electrical connection with the output of the detection circuit 80 in each sub-pixel unit, and an output of the data drive circuit 100 may be in electrical connection with the first data input circuit 10 in each sub-pixel unit. The data drive circuit 100 is configured to adjust the data voltage output from the first data input circuit 10 in each sub-pixel unit according to a detection signal output from the detection circuit 80 in each sub-pixel unit.

For example, when the data drive circuit 100 detects that the OLED1 in a certain sub-pixel unit is damaged, the data drive circuit 100 is capable of adjusting the brightness of OLED1 in other sub-pixel units by adjusting the data voltage output from the first data input circuit 10 of the other sub-pixel units, to enable the brightness of OLED1 of other sub-pixel units to be consistent with the brightness of the damaged OLED1. The current regulation circuit is configured to follow a brightness variation of OLED1 and regulate the driving current (i.e., the second driving current) of OLED2 (the second light-emitting device) to adjust the brightness of the OLED2, to ensure that the brightness of OLED1 and OLED2 of all sub-pixel units is the same, and to ensure that the brightness of each sub-pixel unit is the same, thereby improving the uniformity of the display screen.

The structure of each sub-pixel unit in the display panel provided by the embodiment of the present application is similar, and will not be repeated here.

It can be understood that the circuit modules illustrated in the embodiments of the present application do not constitute a specific limitation on the pixel drive circuit. In other embodiments of the present application, the pixel drive circuit may include more or fewer circuit modules than that shown in the figures, or some circuit modules may be combined, or some circuit modules may be split; each circuit module may include more or fewer devices than that shown in the figures. The illustrated circuit modules may be implemented in hardware, software or a combination of software and hardware.

The technical solution provided by the embodiment of the present application includes a first data input circuit, a second data input circuit, a current regulation circuit, a first energy storage circuit, a second energy storage circuit, a first light-emitting control circuit and a second light-emitting control circuit. The first data input circuit is in electrical connection with a control end of the first light-emitting control circuit, and is configured to output a data voltage to the control end of the first light-emitting control circuit in a reset phase and a compensation phase. The second data input circuit is in electrical connection with a control end of the second light-emitting control circuit, and is configured to output the data voltage to the control end of the second light-emitting control circuit in the reset phase and the compensation phase. The first energy storage circuit is connected between the control end and an output of the first light-emitting control circuit, and the second energy storage circuit is connected between the control end and an output of the second light-emitting control circuit. Both the first energy storage circuit and the second light-emitting control circuit are configured to store electric energy. Both an input of the first light-emitting control circuit and an input of the second light-emitting control circuit are in electrical connection with a first power supply. The output of the first light-emitting control circuit is in electrical connection with an anode of a first light-emitting device, and the first light-emitting control circuit is configured to output a first driving current to the first light-emitting device. The output of the second light-emitting control circuit is in electrical connection with an anode of a second light-emitting device, and the second light-emitting control circuit is configured to output a second driving current to the second light-emitting device in the light emitting phase. Both a cathode of the first light-emitting device and a cathode of the second light-emitting device are in electrical connection with a second power supply. The first light-emitting device and the second light-emitting device emit light simultaneously. The current regulation circuit is in electrical connection with an output of the second data input circuit, and the current regulation circuit is configured to regulate a voltage at the control end of the second light-emitting control circuit in the reset phase and the compensation phase, so as to regulate the second driving current in the light-emitting phase. In the above technical solution, the first light-emitting device and the second light-emitting device are configured to emit light simultaneously, the first light-emitting device and the second light-emitting device are respectively driven by different light-emitting control circuits. The current regulation circuit is enabled to adjust the brightness of the second light-emitting device by regulating the driving current of the second light-emitting device (i.e., the second driving current), thereby enabling the brightness of the second light-emitting device to approach that of the first light-emitting device, so that this solution can reduce the difference in brightness of the first light-emitting device and the second light-emitting device caused by the difference in characteristics of the first light-emitting device and the second light-emitting device, thereby enabling the brightness of different sub-pixels tend to be consistent, which improves the uniformity of the display screen.

In the above embodiments, the descriptions of each embodiment have their own emphases, and for parts that are not detailed or recorded in a certain embodiment, references may be made to the relevant descriptions of other embodiments.

It should be understood that the term “comprising”, when used in the specification and claims of the present application, indicates a presence of described features, integers, steps, operations, elements and/or components, but does not exclude the presence or addition of one or more other features, wholes, steps, operations, elements, components and/or combinations thereof.

The naming or numbering of the steps in the present application does not mean that the steps in the method flow must be executed in the time/logic sequence indicated by the naming or numbering. The order of execution for the named or numbered process steps can be changed based on the technical objectives to be achieved, as long as the same or similar technical effect can be achieved.

In the description of the present application, unless otherwise specified, “/” means that the objects associated with each other are an “or” relationship, for example, A/B may mean A or B. the expression “and/or” in the present application is only an association relationship describing associated objects, which means that three kinds of relationships may be included, for example, A and/or B, may include three cases, that is, A exists alone, both A and B exist, and B exists alone, among which A, B C may be singular or plural.

In addition, in the description of the present application, unless otherwise specified, the phrase “a plurality of” means two or more than two. “at least one of the following” or similar expressions refer to any combination of these items, including any combination of single items or plural items. For example, at least one of a, b, or c may include that: a, b, c, a-b, a-c, b-c, or a-b-c, wherein a, b, c may be singular or plural.

As used in the specification and the appended claims of the present application, the term “if” may be construed, depending on the context, as “when” or “once” or “in response to determining” or “in response to detecting”. Similarly, the phrase “if determined” or “if [the described condition or event] is detected” may be construed, depending on the context, to mean “once determined” or “in response to the determination” or “once detected [the described condition or event]” or “in response to detection of [described condition or event]”.

In addition, in the description of the specification and the appended claims of the present application, the terms “first”, “second”, “third” and so on are used to distinguish similar objects, and are not necessarily used to describe a specific order or sequence order. It should be understood that the terms so used are interchangeable under appropriate circumstances such that the embodiments described herein can be practiced in sequences other than those illustrated or described herein.

References to “one embodiment” or “some embodiments” or the like described in the specification of the present application mean that a particular feature, structure or characteristic described in connection with that embodiment is included in one or more embodiments of the present application. Thus, appearances of the phrases “in one embodiment,” “in some embodiments,” “in other embodiments,” “in some other embodiments,” etc. in various places in this specification are not necessarily all refer to the same embodiment, but mean “one or more but not all embodiments” unless specifically stated otherwise.

Finally, it should be noted that: the above embodiments are only used to illustrate the technical solutions of the present application, and are not intended to limit it. Although the present application has been described in detail with reference to the foregoing embodiments, those of ordinary skills in the art should understand that the technical solutions described in the foregoing embodiments may still be modified, or some or all of the technical features thereof may be equivalently replaced; and these modifications or replacements do not make the essence of the corresponding technical solutions deviate from the scope pf the technical solutions of the various embodiments of the present application.

What is claimed is:

1. A pixel drive circuit, comprising: a first data input circuit, a second data input circuit, a current regulation circuit, a first energy storage circuit, a second energy storage circuit, a first light-emitting control circuit and a second light-emitting control circuit;

wherein the first data input circuit is in electrical connection with a control end of the first light-emitting control circuit and is configured to output a data voltage to the control end of the first light-emitting control circuit in a reset phase and a compensation phase; the second data input circuit is in electrical connection with a control end of the second light-emitting control circuit and is configured to output the data voltage to the control end of the second light-emitting control circuit in the reset phase and the compensation phase;

the first energy storage circuit is connected between the control end and an output of the first light-emitting control circuit; the second energy storage circuit is connected between the control end and an output of the second light-emitting control circuit, and both the first energy storage circuit and the second energy storage circuit are configured to store electrical energy;

an input of the first light-emitting control circuit and an input of the second light-emitting control circuit are both in electrical connection with a first power supply, the output of the first light-emitting control circuit is in electrical connection with an anode of a first light-emitting device, and the first light-emitting control circuit is configured to output a first driving current to the first light-emitting device in a light-emitting phase; the output of the second light-emitting control circuit is in electrical connection with an anode of a second light-emitting device, and the second light-emitting control circuit is configured to output a second driving current to the second light-emitting device in the light-emitting phase; a cathode of the first light-emitting device and a cathode of the second light-emitting device are both in electrical connection with a second power supply; the first light-emitting device and the second light-emitting device are configured to emit light simultaneously;

the current regulation circuit is in electrical connection with an output of the second data input circuit, and the current regulation circuit is configured to regulate a voltage at the control end of the second light-emitting control circuit in the reset phase and the compensation phase, to regulate the second driving current in the light-emitting phase; and wherein the current regulation circuit comprises a first switch, a voltage signal line and a first scan line; a control electrode of the first switch is in electrical connection with an output of the first scan line, a first electrode of the first switch is in electrical connection with an output of the voltage signal line, and a second electrode of the first switch is in electrical connection with the output of the second data input circuit.

2. The pixel drive circuit according to claim 1, wherein the voltage signal line is configured to output a constant voltage.

3. The pixel drive circuit according to claim 1, wherein the first data input circuit comprises a second switch, a data line, and a first scan line; the second data input circuit comprises a third switch, the data line, and the first scan line; and a control electrode of the second switch and a control electrode of the third switch are both in electrical connection with an output of the first scan line, a first electrode of the second switch and a first electrode of the third switch are both in electrical connection with an output of the data line, a second electrode of the second switch is in electrical connection with the control end of the first light-emitting control circuit, and a second electrode of the third switch is in electrical connection with the control end of the second light-emitting control circuit.

4. The pixel drive circuit according to claim 1, further comprising: a detection circuit and a compensation circuit;

an input of the detection circuit is in electrical connection with the output of the first light-emitting control circuit, an output of the detection circuit is in electrical connection with an input of the compensation circuit, and the detection circuit is configured to detect the first driving current output from the first light-emitting control circuit in the light-emitting phase; and an output of the compensation circuit is in electrical connection with the first data input circuit, and the compensation circuit is configured to regulate the data voltage output from the first data input circuit according to the first driving current in the reset phase and the compensation phase.

5. The pixel drive circuit according to claim 4, wherein the detection circuit comprises: a fourth switch and a current sensor;

a control electrode of the fourth switch is in electrical connection with the second scan line, a first electrode of the fourth switch is in electrical connection with the output of the second light-emitting control circuit, a second electrode of the fourth switch is in electrical connection with an input of the current sensor, and an output of the current sensor is in electrical connection with the input of the compensation circuit.

6. The pixel drive circuit according to claim 1, wherein the first light-emitting control circuit comprises a fifth switch, and the second light-emitting control circuit comprises a sixth switch;

a first electrode of the fifth switch and a first electrode of the sixth switch are both in electrical connection with the first power supply, a second electrode of the fifth switch is in electrical connection with the anode of the first light-emitting device, a control electrode of the fifth switch is in electrical connection with the first data input circuit, a second electrode of the sixth switch is in electrical connection with the anode of the second light-emitting device, and a control electrode of the sixth switch is electrically connected with the second data input circuit.

7. The pixel drive circuit according to claim 1, wherein an absolute value of a difference between the second driving current after being regulated and the first driving current is smaller than an absolute value of a difference between the second driving current before being regulated and the first driving current.

8. A pixel drive method, applied to a pixel drive circuit, the pixel drive circuit, comprising: a first data input circuit, a second data input circuit, a current regulation circuit, a first energy storage circuit, a second energy storage circuit, a first light-emitting control circuit and a second light-emitting control circuit;

wherein the first data input circuit is in electrical connection with a control end of the first light-emitting control circuit and is configured to output a data voltage to the control end of the first light-emitting control circuit in a reset phase and a compensation phase; the second data input circuit is in electrical connection with a control end of the second light-emitting control circuit and is configured to output the data voltage to the control end of the second light-emitting control circuit in the reset phase and the compensation phase;

the first energy storage circuit is connected between the control end and an output of the first light-emitting control circuit; the second energy storage circuit is connected between the control end and an output of the second light-emitting control circuit, and both the first energy storage circuit and the second energy storage circuit are configured to store electrical energy;

an input of the first light-emitting control circuit and an input of the second light-emitting control circuit are both in electrical connection with a first power supply, the output of the first light-emitting control circuit is in electrical connection with an anode of a first light-emitting device, and the first light-emitting control circuit is configured to output a first driving current to the first light-emitting device in a light-emitting phase; the output of the second light-emitting control circuit is in electrical connection with an anode of a second light-emitting device, and the second light-emitting control circuit is configured to output a second driving current to the second light-emitting device in the light-emitting phase; a cathode of the first light-emitting device and a cathode of the second light-emitting device are both in electrical connection with a second power supply; the first light-emitting device and the second light-emitting device are configured to emit light simultaneously; and the current regulation circuit is in electrical connection with an output of the second data input circuit, and the current regulation circuit is configured to regulate a voltage at the control end of the second light-emitting control circuit in the reset phase and the compensation phase, to regulate the second driving current in the light-emitting phase, and the pixel drive method comprising:

inputting, in the reset phase and the compensation phase, a first potential signal to the first data input circuit, the second data input circuit, and the current regulation circuit, to control the first data input circuit, the second data input circuit and the current regulation circuit to be switched on; and inputting, in the light-emitting phase, a second potential signal to the first data input circuit, the second data input circuit, and the current regulation circuit, to control the first data input circuit, the second data input circuit and the current regulation circuit to be switched off.

9. The pixel drive method according to claim 8, further comprising:

in the reset phase and the compensation phase, inputting the second potential signal to the detection circuit, to control the detection circuit to be switched off; and in the light-emitting phase, inputting the first potential signal to the detection circuit to control the detection circuit to be switched on.

10. A display panel, comprising:

a plurality of pixel units, each pixel unit comprising:

a plurality of sub-pixel units, each sub-pixel unit comprising:

a first light-emitting device, and a second light-emitting device; and a pixel drive circuit comprising:

a first data input circuit, a second data input circuit, a current regulation circuit, a first energy storage circuit, a second energy storage circuit, a first light-emitting control circuit, and a second light-emitting control circuit;

wherein the first data input circuit is in electrical connection with a control end of the first light-emitting control circuit and is configured to output a data voltage to the control end of the first light-emitting control circuit in a reset phase and a compensation phase; the second data input circuit is in electrical connection with a control end of the second light-emitting control circuit and is configured to output the data voltage to the control end of the second light-emitting control circuit in the reset phase and the compensation phase;

the first energy storage circuit is connected between the control end and an output of the first light-emitting control circuit; the second energy storage circuit is connected between the control end and an output of the second light-emitting control circuit, and both the first energy storage circuit and the second energy storage circuit are configured to store electrical energy;

an input of the first light-emitting control circuit and an input of the second light-emitting control circuit are both in electrical connection with a first power supply, the output of the first light-emitting control circuit is in electrical connection with an anode of the first light-emitting device, and the first light-emitting control circuit is configured to output a first driving current to the first light-emitting device in a light-emitting phase; the output of the second light-emitting control circuit is in electrical connection with an anode of the second light-emitting device, and the second light-emitting control circuit is configured to output a second driving current to the second light-emitting device in the light-emitting phase; a cathode of the first light-emitting device and a cathode of the second light-emitting device are both in electrical connection with a second power supply; the first light-emitting device and the second light-emitting device are configured to emit light simultaneously;

the current regulation circuit is in electrical connection with an output of the second data input circuit, and the current regulation circuit is configured to regulate a voltage at the control end of the second light-emitting control circuit in the reset phase and the compensation phase, so as to regulate the second driving current in the light-emitting phase; and wherein the current regulation circuit comprises a first switch, a voltage signal line, and a first scan line; a control electrode of the first switch is in electrical connection with an output of the first scan line, a first electrode of the first switch is in electrical connection with an output of the voltage signal line, and a second electrode of the first switch is in electrical connection with the output of the second data input circuit.

11. The display panel according to claim 10, wherein the voltage signal line is configured to output a constant voltage.

12. The display panel according to claim 10, wherein the first data input circuit comprises a second switch, a data line, and a first scan line; the second data input circuit comprises a third switch, the data line, and the first scan line;

a control electrode of the second switch and a control electrode of the third switch are both in electrical connection with an output of the first scan line, a first electrode of the second switch and a first electrode of the third switch are both in electrical connection with an output of the data line, a second electrode of the second switch is in electrical connection with the control end of the first light-emitting control circuit, and a second electrode of the third switch is in electrical connection with the control end of the second light-emitting control circuit.

13. The display panel according to claim 10, further comprising: a detection circuit and a compensation circuit;

an input of the detection circuit is in electrical connection with the output of the first light-emitting control circuit, an output of the detection circuit is in electrical connection with an input of the compensation circuit, and the detection circuit is configured to detect the first driving current output from the first light-emitting control circuit in the light-emitting phase; and an output of the compensation circuit is in electrical connection with the first data input circuit, and the compensation circuit is configured to regulate the data voltage output from the first data input circuit according to the first driving current in the reset phase and the compensation phase.

14. The display panel according to claim 13, wherein the detection circuit comprises: a fourth switch and a current sensor;

a control electrode of the fourth switch is in electrical connection with the second scan line, a first electrode of the fourth switch is in electrical connection with the output of the second light-emitting control circuit, a second electrode of the fourth switch is in electrical connection with an input of the current sensor, and an output of the current sensor is in electrical connection with the input of the compensation circuit.

15. The display panel according to claim 10, wherein the first light-emitting control circuit comprises a fifth switch, and the second light-emitting control circuit comprises a sixth switch;

a first electrode of the fifth switch and a first electrode of the sixth switch are both in electrical connection with the first power supply, a second electrode of the fifth switch is in electrical connection with the anode of the first light-emitting device, a control electrode of the fifth switch is in electrical connection with the first data input circuit, a second electrode of the sixth switch is in electrical connection with the anode of the second light-emitting device, and a control electrode of the sixth switch is electrically connected with the second data input circuit.

16. The display panel according to claim 10, wherein an absolute value of a difference between the second driving current after being regulated and the first driving current is smaller than an absolute value of a difference between the second driving current before being regulated and the first driving current.

* * * * *